(12) United States Patent
Tate, Jr. et al.

(10) Patent No.: US 8,532,854 B2
(45) Date of Patent: Sep. 10, 2013

(54) METHOD AND APPARATUS FOR MANAGING MULTIPLE BATTERY PACKS IN A HYBRID OR ELECTRIC VEHICLE

(75) Inventors: Edward D. Tate, Jr., Grand Blanc, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 544 days.

(21) Appl. No.: 12/895,914

(22) Filed: Oct. 1, 2010

(65) Prior Publication Data

US 2012/0083948 A1    Apr. 5, 2012

(51) Int. Cl.
*B60L 15/20* (2006.01)
(52) U.S. Cl.
USPC ............... 701/22; 701/36; 180/65.29
(58) Field of Classification Search
USPC ............... 701/22, 36, 29.1, 33.7, 33.8, 33.9; 180/65.29; 320/100–117
See application file for complete search history.

(56) References Cited

U.S. PATENT DOCUMENTS

| | | | | |
|---|---|---|---|---|
| 8,148,944 | B2 * | 4/2012 | Goto | 320/128 |
| 8,264,196 | B2 * | 9/2012 | Mera | 320/104 |
| 2012/0112685 | A1 * | 5/2012 | Hartley et al. | 320/106 |

* cited by examiner

*Primary Examiner* — Richard M. Camby
(74) *Attorney, Agent, or Firm* — Quinn Law Group, PLLC

(57) ABSTRACT

A vehicle includes first and second battery packs having respective first and second banks of contactors. The packs are wired in electrical parallel. A propulsion system is driven using electrical power from the packs. A controller determines which pack has the highest state of charge (SOC), and balances the SOC of the packs by controlling an open/closed state of the contactors. Contactors open to disconnect the pack having the highest SOC, and close again when a voltage difference between the packs is approximately zero. A system for use in the vehicle includes the packs, contactors, and controller. A method for controlling power flow in the vehicle includes determining which pack has the highest SOC, opening designated contactors during a near zero current event to disconnect the battery pack having the highest SOC, and closing the designated contactors when a voltage difference between the packs is approximately zero.

16 Claims, 2 Drawing Sheets

– 2 –

METHOD AND APPARATUS FOR MANAGING MULTIPLE BATTERY PACKS IN A HYBRID OR ELECTRIC VEHICLE

TECHNICAL FIELD

The present invention relates to a method and apparatus for managing power flow to multiple battery packs in a vehicle which can be selectively propelled using electrical energy provided from the multiple battery packs.

BACKGROUND

Certain emerging vehicle designs can be propelled at least part of the time using only electrical energy. For example, hybrid electric vehicles (HEV), plug-in HEV (PHEV), and extended-range electric vehicles (EREV) each have one or more electric-only (EV) modes. An HEV and a PHEV may use an internal combustion engine as an energy source to supply torque to a set of drive wheels, while the EREV can use a smaller engine to power an electrical generator when more electricity is required. Battery electric vehicles (BEV) can be propelled exclusively in an EV mode, and therefore such vehicles do not require an engine.

Regardless of the vehicle embodiment, a rechargeable high-voltage battery pack can be used to alternatively store and deliver the substantial electrical energy needed for driving one or more traction motors of the vehicle's propulsion system. Depending on the design, the battery pack may be recharged when the vehicle is not in use by plugging the vehicle into an off-board power outlet. The battery pack of most EV-capable vehicles can also be charged when the vehicle is in operation using the energy captured during a regenerative braking event or other regenerative event.

SUMMARY

Accordingly, a vehicle is disclosed herein which balances a state of charge (SOC) across a plurality of rechargeable battery packs connected in electrical parallel with respect to each other. Such a vehicle may be embodied as a hybrid electric vehicle (HEV), a plug-in HEV, an extended-range electric vehicle, or a battery electric vehicle as described above. The parallel battery packs collectively feed electrical power to a propulsion system having one or more traction motors. Each battery pack includes a bank of solid-state relays or contactors, the open/closed states of which are selected by the controller during the various operating modes of the vehicle to automatically balance the SOC of the various battery packs.

In particular, a vehicle as set forth herein includes first and second battery packs having respective first and second banks of contactors. The battery packs are wired in electrical parallel with respect to each other as noted above. The vehicle includes a propulsion system driven using electrical power from the battery packs, and a controller in electrical communication with the battery packs. The controller automatically determines which battery pack has the highest SOC, and then balances the SOC of the various parallel battery packs by controlling an open/closed state of the first or second bank of contactors as needed. The controller selectively opens a designated bank of contactors, e.g., during a regenerative event of the vehicle or during another near zero or zero electrical current event, thereby temporarily disconnecting the battery pack having the highest SOC from the propulsion system. The controller closes the same bank of contactors when the voltage difference between packs is at or near zero, e.g., when the vehicle accelerates.

A system is also provided for use in a vehicle having a propulsion system driven using electrical power. The system includes a first battery pack having a first bank of contactors, a second battery pack having a second bank of contactors, and a controller. The second battery pack is wired in electrical parallel with respect to the first battery pack. The controller is in electrical communication with the battery packs, and is adapted for determining which of the battery packs has the highest SOC. The controller selectively opens a designated bank of contactors during a regenerative event of the vehicle to thereby temporarily disconnect the battery pack having the highest SOC from the propulsion system during a zero or zero electrical current event. The designated bank of contactors closes when the voltage difference between packs is at or near zero.

A method is also provided for controlling power flow in a vehicle having a plurality of battery packs wired in electrical parallel with respect to each other. The method includes determining which of the battery packs has the highest SOC relative to the other battery pack, and opening a designated one of a first and a second bank of contactors of the respective first and second battery packs during a regenerative event or other near zero electrical current event to temporarily disconnect the battery pack having the highest SOC from the propulsion system. The method includes closing the designated bank of contactors when a voltage difference between packs is at or near zero.

The above features and advantages and other features and advantages of the present invention are readily apparent from the following detailed description of the best modes for carrying out the invention when taken in connection with the accompanying drawings.

DESCRIPTION

Figure 1:
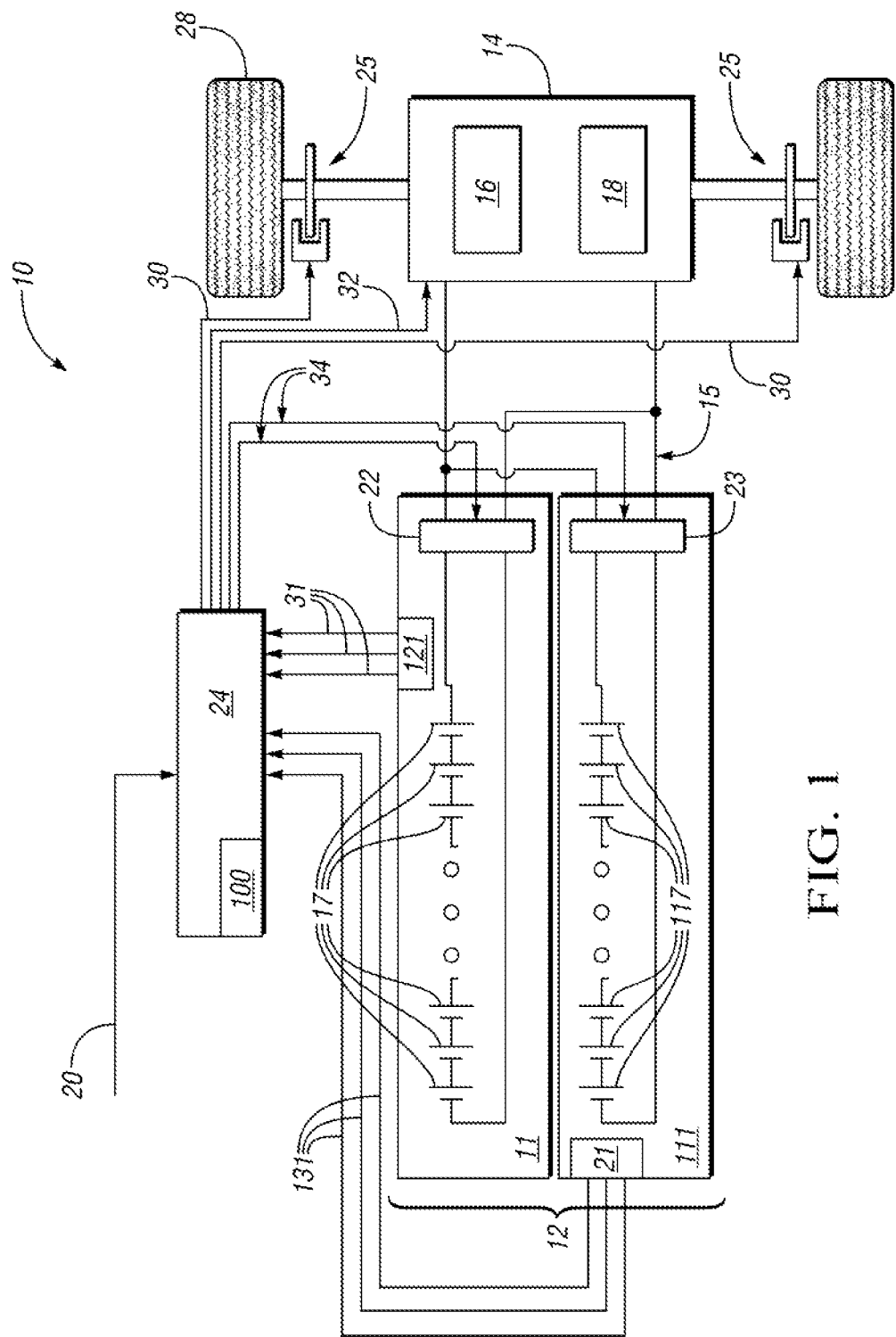
FIG. 1 is a schematic illustration of a vehicle having multiple parallel battery packs as set forth herein.

Referring to the drawings, and beginning with FIG. 1, a vehicle 10 is shown which may be alternatively configured as a hybrid electric vehicle (HEV), a plug-in HEV (PHEV), an extended-range electric vehicle (EREV), or a battery electric vehicle (BEV). As such, the vehicle 10 can draw electrical energy from and deliver electrical energy to a rechargeable onboard energy storage system (ESS) 12. The ESS 12 is adapted for storing high-voltage electrical energy needed for propelling the vehicle 10. ESS 12 may be rated for approximately 60 to 300 VDC or more depending on the power ratings of the various electrical devices drawing electrical power from the ESS.

The ESS 12 includes multiple high-voltage, independently-rechargeable battery packs 11, 111. While only two battery packs are shown in FIG. 1 for illustrative simplicity, any plurality of parallel battery packs may be used aboard the vehicle 10. The battery packs 11, 111 may be connected in electrical parallel with respect to each other via a high-voltage bus bar 15. The battery packs 11, 111 may include a respective stack 17, 117 of cells, e.g., lithium ion cells, nickel metal hydride cells, or other rechargeable electrochemical cells providing a sufficiently high power density, as well as any required conductive interconnecting rails and battery support structure.

Control of the required electrical power flow to and from the battery packs 11, 111 is provided by a controller 24, and is described in detail below with reference to FIGS. 2 and 3. The battery packs 11, 111 each include a respective pair of solid-state relays or contactors 22, 23. Contactors 22, 23 are in communication with a controller 24, and are independently responsive to signals from the controller as explained below. Contactors 22, 23 are adapted to close under electrical load so as to ensure the instantaneous or near instantaneous delivery of electrical power to a propulsion system 14 when needed.

Multiple battery packs wired in electrical parallel can pose an electrical control problem due to the different states of charge (SOC) of each battery pack. To properly manage multiple battery packs such as the battery packs 11 and 111 of FIG. 1, a relatively complex and expensive DC-DC converter device and associated control hardware is typically used to shuttle energy between the various battery packs. By contrast, the presently disclosed controller 24, a power flow control algorithm 100, and contactors 22, 23 dispenses of such a DC-DC converter. Instead, the SOCs of battery packs 11, 111 are automatically balanced with respect to each other by operation of the contactors 22, 23. Greater freedom is provided for packaging multiple battery packs aboard a vehicle. This freedom comes with a reduced cost of managing the power flow to the various battery packs when wired in electrical parallel.

The propulsion system 14 noted above may include a transmission 16, e.g., an electrically-variable transmission, planetary gear sets, etc. Propulsion system 14 includes one or more traction motors 18. Each motor 18 may be configured in one possible embodiment as a multi-phase AC induction-type electric machine. While not shown in FIG. 1, those of ordinary skill in the art will recognize that an internal combustion engine may be selectively connected to the propulsion system 14, e.g., in HEV and PHEV embodiments. Vehicle 10 may be alternatively configured as an EREV, wherein an engine of reduced size may be used to power a generator (not shown), and to thereby extend the EV range of the vehicle.

Still referring to FIG. 1, the controller 24 executes the power flow control algorithm 100 or other suitable control logic to control a flow of electrical energy to the battery packs 11, 111 in a manner which varies with the vehicle operating mode. Controller 24 may be configured as a digital computer having a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. Any algorithms resident in the controller or accessible thereby, including algorithm 100, can be stored in ROM and automatically executed by the controller to establish the various operating modes.

The vehicle 10 includes friction braking components 25 at each of a plurality of drive wheels 28. Friction braking components 25 are responsive to braking torque signals 30 transmitted from the controller 24, and the braking force provided by the friction braking components may be assisted by electricity from the battery packs 11, 111. However, the friction braking components 25 are adapted to brake the vehicle 10 without requiring such an electrical assist, as noted below, which allows designated battery packs to be selectively and temporarily disconnected from the propulsion system 14 when balancing the SOC across the various battery packs 11, 111.

Controller 24 also calculates and transmits regeneration/acceleration torque commands 32 to the propulsion system 14, as well as contactor open/closed state commands 34 to one or more of the contactors 22, 23 as needed. In turn, the controller 24 receives status signals 31, 131 from the respective battery packs 11 and 111, either by directly measuring the values encoded in such signals or by receiving signals transmitted by respective sensors 21, 121. Status signals 31, 131 in one embodiment include each of the electrical current level, voltage level, and SOC of the battery packs 11 and 111, and may include other values depending on the design of vehicle 10 and controller 24.

When the vehicle 10 is actively braking, which may be determined via signals 20 communicated to the controller 24, e.g., measured or sensed current operating conditions or states of the vehicle 10, energy is captured and delivered to the battery packs 11, 111 in a process known as a regenerative braking event. Other regenerative events other than braking can be used to collect energy that would otherwise be largely wasted, and to divert the energy to the ESS 12. Friction braking components 25 are designed to manage base braking requirements without electric assist, as noted above. For example, friction braking components 25 should have sufficient hydraulic apply force for stopping the vehicle 10 even absent temporarily non-availability of electrical energy from a given one of the battery packs 11, 111. Because the friction braking components 25 are capable of braking the vehicle 10 without electrical assist from the ESS 12, e.g., via motor torque from the motor(s) 18 driven by energy from the ESS, one or more of the battery packs 11, 111 of the ESS may be temporarily disconnected by controller 24 in order to balance SOC across the ESS as set forth below. This is done without adversely affecting braking performance.

As noted above, battery packs 11, 111 each include respective contactors 22, 23. Contactors 22, 23 selectively disconnect a respective one of the battery packs 11, 111 from the high-voltage bus bar 15 during low-load conditions, and later reconnect the battery packs 11, 111 to the high-voltage bus bar during high-load conditions. The SOC of each battery pack 11, 111 is monitored by the controller 24. In the event energy and/or thermal balance between the various battery packs 11, 111 becomes imbalanced during a regenerative event, the controller 24 can automatically open a designated one of the contactors 22, 23 to isolate a given battery pack when two battery packs are used, or multiple battery packs when more than two battery packs are used.

By asymmetrically isolating selected battery packs 11, 111 during a regenerative event, balance of charge or thermal energy may be restored without adversely affecting vehicle braking performance. It is expected that such balancing should be required only intermittently, and therefore the useful life of the contactors 22, 23 may be extended. The contactors 22, 23 are designed as solid-state devices which can engage under an electrical load, and therefore full battery power is almost instantaneously available from the battery packs 11, 111 for powering vehicle acceleration.

Figure 2:
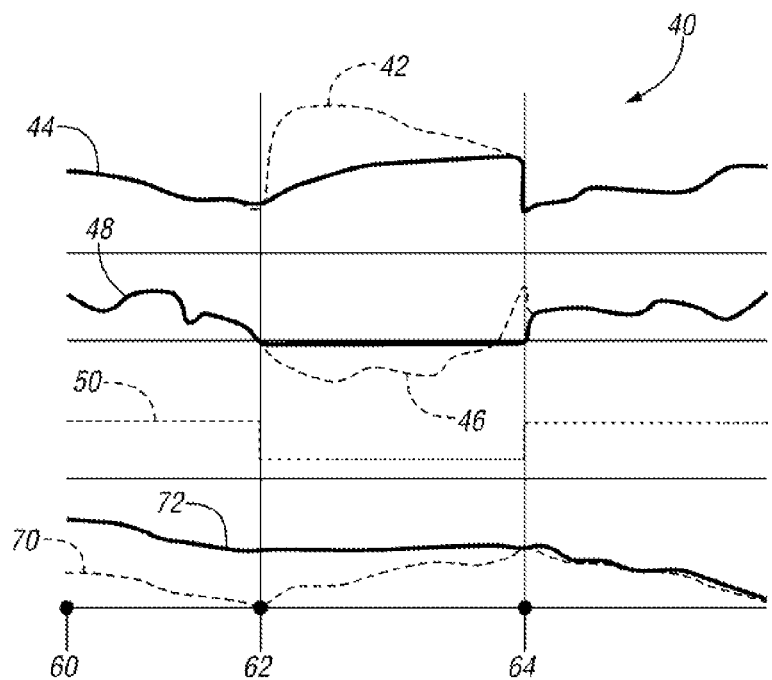
FIG. 2 is a time plot of various operating parameters of the parallel battery packs shown in FIG. 1.

Referring to FIG. 2, a set of performance traces 40 is shown to describe the operation of controller 24 in executing the algorithm 100. Performance traces 40 are the individual traces of the various status signals 31, 131 described above with reference to FIG. 1. FIG. 2 is described with reference to just one possible illustrative scenario, i.e., a scenario wherein the battery pack 111 has a high SOC relative to the SOC of battery pack 11. The actual battery pack having the highest SOC will vary in actual operation.

Voltage trace 42 represents the electric potential of battery pack 11. Likewise, voltage trace 44 represents the electric potential of battery pack 111. Current traces 46, 48 represent the electrical current passing into the battery packs 11 and 111, respectively. SOC traces 70, 72 represent the SOC of battery packs 11 and 111, respectively. State line 50 represents the open/closed state of the bank of contactors 22 of battery pack 11.

Between t=1 and t=2, time points which are respectively represented by points 60 and 62 in FIG. 2, the battery pack 11 has the lower SOC relative to battery pack 111. That is, the value of SOC trace 70 of battery pack 11 is less than the value of SOC trace 72 of battery pack 111. During normal operation of the vehicle 10, i.e., when the vehicle is cruising under motor and/or engine power, both battery packs 11 and 111 are electrically connected to the propulsion system 14 and are thus ready for use.

Beginning at t=2 or point 62, e.g., as a regenerative event which charges the battery packs 11 and 111 begins at a zero or near-zero electrical current condition, the values of current traces 46 and 48 are both at or very near zero, and the contactors 23 of the highest SOC battery pack are opened, in this example the battery pack 111. The friction braking components 25 are, as noted above, configured to handle the temporarily reduced regenerating capacity caused by the opening of contactors 23.

At t=3 (point 64), vehicle acceleration resumes, or when the disconnected pack begins to discharge, and the contactors 23 are again closed via contactor signals 34 generated by and transmitted from the controller 24. This occurs as the voltage difference between the battery packs 11 and 111 is at or near zero. This near-zero voltage difference can be seen in the merging of voltage traces 42 and 44 in FIG. 2 at approximately t=3. Because battery pack 11 receives all of the regenerative pulse between t=2 and t=3, i.e., between points 62 and 64, the SOC of battery pack 11 rises as indicated by the upward trajectory of SOC trace 70. The SOC of battery pack 111 changes very little in the same duration, as indicated by the substantially constant path of SOC trace 72. The SOC difference between battery packs 11 and 111 is thus much reduced at t=3 (point 64) relative to the same value at t=2 (point 62).

As the performance traces 40 indicate, the contactors 22, 23 are opened only during zero or near-zero/very low current conditions. This helps to extend the life of the contactors 22, 23. During a transition to regenerative braking, selected ones of the contactors 22, 23 are opened only when the current trace for that particular battery pack passes through zero. During the transition from regenerative braking to acceleration, the closing of the contactors is coordinated to minimize energy transfer due to voltage difference between the various battery packs. Since a regenerative event may provide more energy than is required to balance the SOC between battery packs, excess energy may be dissipated via the friction braking components 25.

Figure 3:
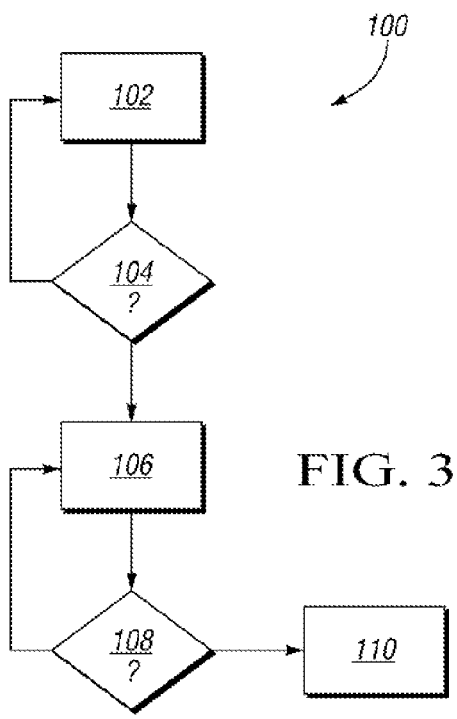
FIG. 3 is a flow chart describing the method for controlling power flow to the parallel battery packs shown in FIG. 1.

Referring to FIG. 3, algorithm 100 is automatically executed by controller 24 during the operation of a vehicle having multiple battery packs connected in electrical parallel, e.g., the vehicle 10 of FIG. 1 with its battery packs 11, 111. Algorithm 100 begins with step 102, wherein the SOC of the various battery packs is determined during operation of the vehicle 10, e.g., during cruise when battery packs 11, 111 are connected and available for use. Step 102 may entail sensing, measuring, calculating, or otherwise determining the SOC of each of the battery packs 11, 111 of FIG. 1. Status signals 31, 131 may be used for this purpose. In keeping with the scenario described above with reference to FIG. 2, FIG. 3 will be described hereinafter using an example in which the SOC of battery pack 11 is less than that of battery pack 111.

At step 104, controller 24 determines whether a regenerative event or other charging event or near-zero electrical current event has been initiated. If so, the algorithm 100 proceeds to step 106. If not, the algorithm 100 repeats steps 102 and 104 in a loop until a regenerative event is determined by the controller 24 to be present.

At step 106, as the regenerative event begins, and when near-zero current conditions occur at t=1 (point 60) of FIG. 2, the controller 24 opens the contactors 23 of battery pack 111, which is the battery pack having the highest SOC in the present illustrative scenario. Friction braking components 25 of FIG. 1 are configured to handle the reduced regenerating capacity caused by the opening of contactors 23, as noted above. The algorithm 100 proceeds to step 108 when the contactors 23 are in an open state.

At step 108, the controller 24 determines whether acceleration of vehicle 10 has or is about to resume, e.g., using electrical and/or mechanical throttle commands. If so, the algorithm 100 proceeds to step 110. If imminent or present acceleration is not determined, steps 106 and 108 are repeated in a loop until acceleration is determined.

At step 110, controller 24 closes contactors 23 as acceleration starts and the voltage difference between the battery packs 11, 111 is at or near zero. Because in the present scenario battery pack 11 receives all of the regenerative pulse, the SOC difference between the battery packs 11 and 111 is reduced.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a first battery pack having a first bank of contactors;
   a second battery pack having a second bank of contactors, wherein the second battery pack is wired in electrical parallel with respect to the first battery pack;
   a propulsion system driven using electrical power from at least one of the first and the second battery packs; and
   a controller in electrical communication with the first and the second battery packs, wherein the controller is adapted for determining which of the first and the second battery packs has the highest state of charge (SOC), and for automatically balancing the SOC by controlling a state of the first or the second bank of contactors;
   wherein the controller selectively opens a designated one of the first and the second bank of contactors when electrical current in the battery pack having the highest SOC is approximately zero, thereby temporarily disconnecting the battery pack having the highest SOC from the propulsion system, and closes the designated one of the first and the second bank of contactors when a voltage difference between the first and the second battery packs is approximately zero.

2. The vehicle of claim 1, wherein the controller is operable for opening the designated one of the first and the second bank of contactors during a regenerative braking event of the vehicle.

3. The vehicle of claim 2, further comprising friction braking components, wherein the controller dissipates excess energy generated during the regenerative braking event using the friction braking components.

4. The vehicle of claim 3, wherein the friction braking components are operable for braking the vehicle without requiring electrical assistance from either the first battery pack or the second battery pack.

5. The vehicle of claim 1, further comprising a multi-phase AC induction-type electric traction motor which is electrically connected to the first and the second battery packs, wherein the traction motor is adapted for propelling the vehicle in an electric-only mode.

6. The vehicle of claim 1, wherein the controller determines which of the first and the second battery packs has the highest SOC by processing a set of feedback signals describing an electrical current level, a voltage level, and a SOC of each of the first and the second battery packs.

7. A system for use in a vehicle having a propulsion system which is driven using electrical power from the ESS, the system comprising:
   a first battery pack having a first bank of contactors;
   a second battery pack having a second bank of contactors, wherein the second battery pack is wired in electrical parallel with respect to the first battery pack; and
   a controller in electrical communication with the first and the second battery packs, and adapted for determining which of the first and the second battery packs has the highest state of charge (SOC) relative to the other battery pack;
   wherein the controller selectively opens a designated one of the first and the second bank of contactors when electrical current in the battery pack having the highest SOC is approximately zero, thereby temporarily disconnecting the battery pack having the highest SOC from the propulsion system, and closes the designated one of the first and the second bank of contactors when the voltage difference between the first and the second battery pack is approximately zero.

8. The system of claim 7, wherein the controller is operable for opening the designated one of the first and the second bank of contactors during a regenerative braking event of the vehicle.

9. The system of claim 8, wherein the vehicle includes friction braking components, and wherein the controller dissipates excess energy during the regenerative braking event using the friction braking components.

10. The system of claim 9, wherein the friction braking components are operable for braking the vehicle without requiring electrical energy from either the first or the second battery pack.

11. The system of claim 7, wherein the controller is configured to automatically determine which of the first and the second battery pack has the highest SOC by processing a set of signals describing an electrical current level, a voltage level, and a SOC of each of the battery packs.

12. The system of claim 7, wherein the contactors are adapted to engage under electrical load to thereby ensure electrical power is instantly available from the battery packs when the vehicle accelerates.

13. A method for controlling power flow in a vehicle having a plurality of battery packs wired in electrical parallel with respect to each other, wherein the vehicle uses electrical energy from at least one battery pack of the plurality of battery packs to drive a propulsion system, the method comprising:
   determining which of the first and the second battery pack has the highest state of charge (SOC);
   opening a designated one of a first and a second bank of contactors of the respective first and second battery packs when electrical current in the battery pack having the highest SOC is approximately zero, thereby temporarily disconnecting the battery pack having the highest SOC from the propulsion system; and
   closing the designated bank of contactors when a voltage difference between the first and the second battery pack is approximately zero.

14. The method of claim 13, wherein opening a designated one of the first and the second bank of contactors occurs during a regenerative braking event.

15. The method of claim 14, wherein the vehicle includes friction braking components, the method further comprising:
   dissipating excess energy during the regenerative braking event using the friction braking components.

16. The method of claim 13, further comprising determining which of the first and the second battery pack has the highest SOC by processing a set of signals describing an electrical current level, a voltage level, and a SOC of each of the battery packs.

* * * * *